United States Patent
Kuki et al.

(10) Patent No.: US 9,227,613 B2
(45) Date of Patent: Jan. 5, 2016

(54) VEHICLE BRAKE DEVICE

(71) Applicant: ADVICS CO., LTD., Kariya (JP)

(72) Inventors: Yosuke Kuki, Seto (JP); Yoshimitsu Ozeki, Nagoya (JP); Hiroaki Niino, Toyota (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 135 days.

(21) Appl. No.: 13/777,795

(22) Filed: Feb. 26, 2013

(65) Prior Publication Data

US 2013/0221736 A1  Aug. 29, 2013

(30) Foreign Application Priority Data

Feb. 29, 2012 (JP) ................................ 2012-043556

(51) Int. Cl.
  *B60T 13/68* (2006.01)
  *B60T 8/36* (2006.01)
  *B60T 8/40* (2006.01)

(52) U.S. Cl.
  CPC ................. *B60T 13/686* (2013.01); *B60T 8/36* (2013.01); *B60T 8/4077* (2013.01)

(58) Field of Classification Search
  CPC ....... B60T 13/686; B60T 13/662; B60T 8/36; B60T 8/3655; B60T 8/441; B60T 8/4077; B60T 8/4081; B60T 7/042
  USPC .............................................. 303/155, 116.1
  See application file for complete search history.

(56) References Cited

U.S. PATENT DOCUMENTS

| 4,924,755 A * | 5/1990 | Flory ........................... 91/376 R |
| 6,183,049 B1 * | 2/2001 | Oka et al. ................... 303/114.1 |
| 2001/0054842 A1 | 12/2001 | Tanaka et al. |
| 2005/0275286 A1 * | 12/2005 | Ohmori et al. ................ 303/155 |
| 2006/0033383 A1 * | 2/2006 | Ohlig et al. ..................... 303/15 |
| 2007/0120418 A1 * | 5/2007 | Kajita et al. ............... 303/114.1 |

(Continued)

FOREIGN PATENT DOCUMENTS

| JP | 11-147466 A | 6/1999 |
| JP | 2001-260856 A | 9/2001 |
| JP | 2004-237982 A | 8/2004 |
| JP | 2006298313 A | 11/2006 |

OTHER PUBLICATIONS

Office Action (Notice of Grounds of Rejection) issued on Apr. 15, 2014, by the Japanese Patent Office in corresponding Japanese Patent Application No. 2012-043556 and an English Translation of the Office Action. (4 pages).

*Primary Examiner* — Bradley King
*Assistant Examiner* — Stephen Bowes
(74) *Attorney, Agent, or Firm* — Buchanan Ingersoll & Rooney PC

(57) ABSTRACT

Vehicle brake device comprises a master cylinder including a master chamber connected to a wheel cylinder, a drive pressure chamber in which a drive pressure is generated for driving a master piston and a fluid pressure chamber in which a fluid pressure is generated in response to a stroke position of the master piston and an operating characteristics setting device for setting operating characteristics of an electromagnetic valve. The operating characteristics include a relationship of the pressure differential in the fluid conduit between the master cylinder side and the wheel cylinder side with respect to the electromagnetic valve based on the supply amount of the electric power detected by the supplied electric power detecting device.

3 Claims, 4 Drawing Sheets

(56) References Cited

U.S. PATENT DOCUMENTS

| | | | |
|---|---|---|---|
| 2008/0236971 A1* | 10/2008 | Suzuki et al. | 188/358 |
| 2011/0115282 A1* | 5/2011 | Dinkel et al. | 303/3 |
| 2011/0285199 A1* | 11/2011 | Ishida | 303/3 |
| 2012/0013174 A1* | 1/2012 | Ishida | 303/10 |

\* cited by examiner

Cylinder Opening Side ⟵⟶ Cylinder Bottom Surface Side

VEHICLE BRAKE DEVICE

This application claims priority under 35 U.S.C. 119 with respect to Japanese Application No. 2012-043556 filed in Japan on Feb. 29, 2012, the entire content of which is herein incorporated by reference.

BACKGROUND OF THE INVENTION

1. Field of the Invention

The present invention relates to a vehicle brake device for controlling braking force applied to a vehicle in response to an amount of a brake depression operated by an operator of the vehicle.

2. Discussion of the Related Art

It has been known that a vehicle brake device that is provided with a master cylinder which supplies wheel brake cylinders with brake fluid, a conduit hydraulically connecting the wheel brake cylinders and the master cylinder and an electromagnetic valve disposed in the conduit for generating a predetermined hydraulic pressure differential between the wheel brake cylinders and the master cylinder. In such conventional vehicle brake device, the electromagnetic valve controls the flow of the brake fluid in response to an electric power supplied thereto. Further, a method for obtaining an operating characteristic (such as, for example, a relationship between the minimum valve opening electric current and the hydraulic pressure differential) of an electromagnetic valve constituting a vehicle brake device is disclosed in, for example, JP2004-237982 A (Patent Document 1). According to this disclosed method, the pressure in the conduit in which an electromagnetic valve is disposed, is detected and measured and the operating characteristics are determined based on the measured value of the pressure.

However, according to the structure of the conventional vehicle brake device, the pressure change in the conduit, in which the electromagnetic valve is disposed, tends to be fluctuated or deviated among the individual valves, at the time the electromagnetic valve is opened. Particularly, the pressure in the conduit at wheel brake cylinder side, relative to the electromagnetic valve, tends to be more deviated than the deviation occurred at the other side, the master cylinder side, due to some wheel cylinder structural reasons. Accordingly, when the operating characteristics of the electromagnetic valve disposed in the conduit between the master cylinder and the wheel cylinders are obtained according to a method disclosed in the above Patent Document 1, the setting of the operating characteristics may be affected by such pressure deviation or deviation and it is not easy to accurately determine the operating characteristics.

SUMMARY OF THE INVENTION

The present invention was made in consideration of the above conventional drawbacks and it is an object of the present invention to provide a vehicle brake device which can accurately set the operating characteristics of an electromagnetic valve disposed in the conduit between the master cylinder and the wheel brake cylinders.

According to a first aspect of the present invention, a vehicle brake device is characterized in that the device comprises a master cylinder formed by a master chamber connected to a wheel cylinder, a drive pressure chamber in which a drive pressure is generated for driving a master piston and a fluid pressure chamber in which a fluid pressure is generated in response to a stroke position of the master piston, an electromagnetic valve disposed between the master chamber and the wheel cylinder for controlling a brake fluid flow between the master chamber and the wheel cylinder in response to an electric power supplied to the electromagnetic valve, a pressure differential generating means for generating a predetermined pressure differential between a master cylinder side and a wheel cylinder side with respect to the electromagnetic valve, a supplied electric power controlling means for decreasing or increasing the supply amount of the electric power to the electromagnetic valve under the predetermined pressure differential being generated, a fluid pressure detecting means for detecting that the fluid pressure has reached a predetermined value or more or has decreased to less than the predetermined value in response to a decrease or an increase of the supply of the electric power or for detecting that the fluid pressure has changed by a predetermined range or more, a supplied electric power detecting means for detecting the supply amount of the electric power to the electromagnetic valve when the fluid pressure is detected to have reached the predetermined value or more, or decreased to less than the predetermined value or when the fluid pressure is detected to have changed by the predetermined range or more by the fluid pressure detecting means and an operating characteristics setting means for setting operating characteristics of the electromagnetic valve which include a relationship of the pressure differential between the master cylinder side and the wheel cylinder side with respect to the electromagnetic valve based on the supply amount of the electric power detected by the supplied electric power detecting means.

According to a second aspect of the present invention, the vehicle brake device including the above first aspect, is characterized in that the device further comprises a drive pressure generating means for generating the drive pressure in the drive pressure chamber, wherein the pressure differential generating means generates the predetermined pressure differential by moving the master piston to a predetermined stroke position where a change of the fluid pressure relative to a displacement of the master piston becomes equal to or more than a predetermined range by a control of the drive pressure generating means.

According to a third aspect of the invention, the vehicle brake device including the above second aspect of the invention, is characterized in that the fluid pressure chamber is connected to a stroke simulator.

According to a fourth aspect of the invention, the vehicle brake device including the first aspect of the invention, is characterized in that the master cylinder is structured so that the change of the fluid pressure is set to be larger than a change of the pressure in the master chamber.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
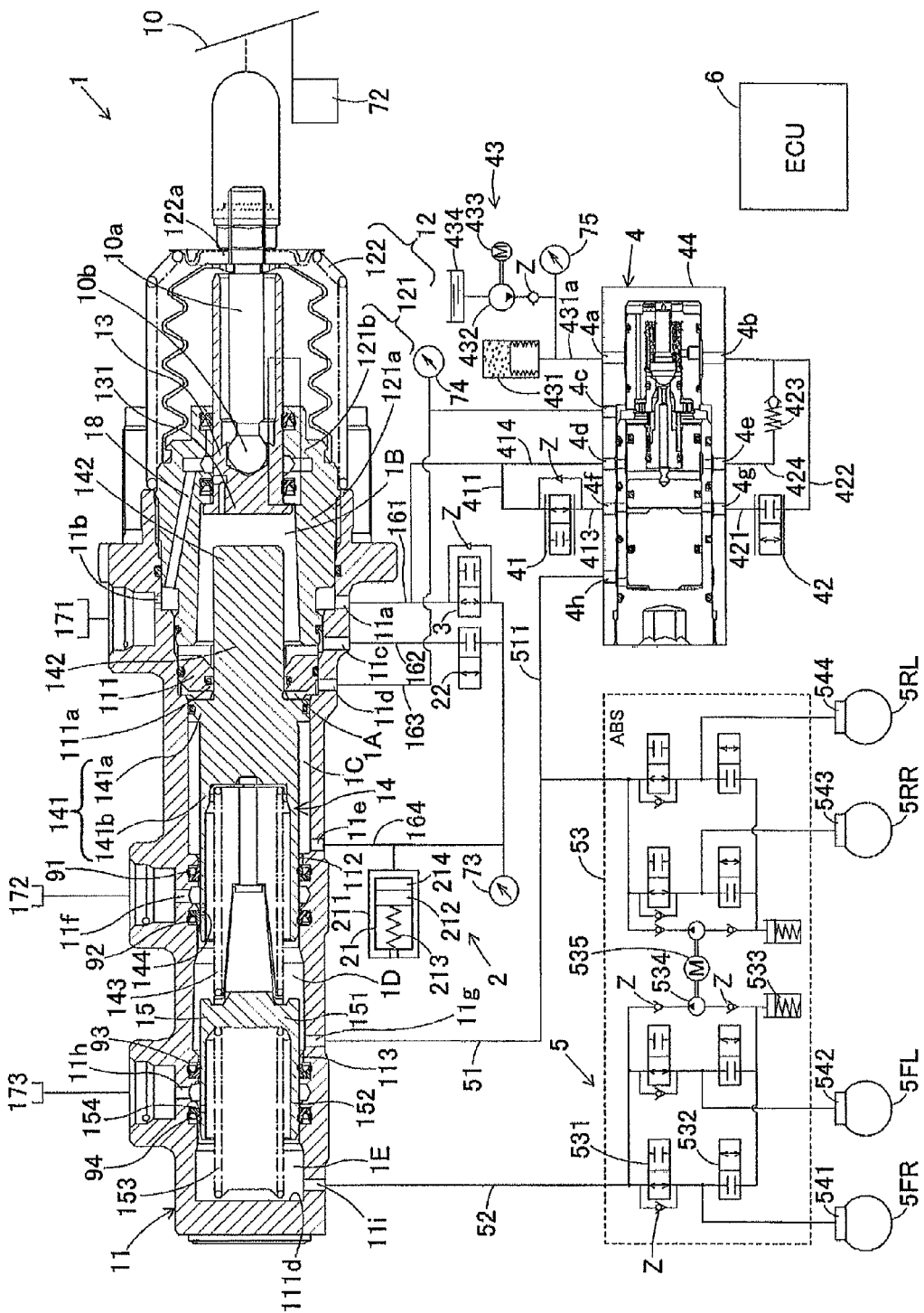
FIG. 1 is an explanatory view of the vehicle brake device showing a partial cross sectional view according to an embodiment of the invention.

Some embodiments/modifications of a vehicle brake device according to the present invention will be described hereinafter with reference to the attached drawings in which each drawing is schematically and explanatorily illustrated and dimensions of the components or detail structures thereof are not defined by these drawings.

The vehicle brake device according to an embodiment includes mainly a master cylinder 1, a reaction force generating device 2, a separation lock valve 22, reaction force valve 3, servo pressure generating device 4 (corresponding to the drive pressure generating means), a brake apparatus 5, a brake ECU 6 and various sensors 72 through 75 which are electrically communicable with the brake ECU 6. In this embodiment, a well-known hybrid ECU is to be connected to the brake ECU 6, but is not illustrated in the drawings.

(Master Cylinder 1)

The master cylinder 1 supplies wheel brake cylinders of the brake apparatus 5 with a brake fluid. The master cylinder 1 includes mainly a main cylinder 11, a cover cylinder 12, an input piston 13 and a first master piston 14 and a second master piston 15.

The main cylinder 11 is formed to be approximately of a cylindrical shape with one end being open and the other end being closed having a bottom surface. It is noted here that the open end side of the main cylinder 11 of the master cylinder 1 is referred to as a rear side and the closed end side (bottom surface end side) is referred to as a front side. The main cylinder 11 includes an inner cylindrical wall portion 111 inside of the cylinder to separate the inside of the cylinder into two parts, open end side and bottom surface end side. A penetration bore 111a is provided at the central portion of the inner cylindrical wall portion 111 and penetrating therethrough in an axial direction (in a front/rear direction) relative to the main cylinder 11.

The main cylinder 11 is provided with a portion 112 (rear side) and a portion 113 (front side) inside of the cylinder and at a frontward portion relative to the inner cylindrical wall portion 111. Each portion has a small diameter portion 112, 113 with an inner diameter smaller than the inner diameter of the inner cylindrical wall portion 111. In other words, small diameter portions 112 and 113 are formed partially in an axial direction and over the entire periphery of the inner peripheral surface of the main cylinder 11 and extending from the inner surface thereof. Master pistons 14 and 15, which will be later explained in detail, are slidably disposed in series inside of the main cylinder 11 in an axial direction. Ports provided on the cylinder for fluid communication between the inside and the outside of the master cylinder 1 will be also later explained in detail.

The cover cylinder 12 includes a cylindrical portion 121 and a U-shaped cover portion 122. The cylindrical portion 121 is disposed in the rear side of the main cylinder 11 and co-axially inserted into the opening of the main cylinder 11. The inner diameter of the front side portion 121a of the cylindrical portion 121 is larger than the inner diameter of the rear side portion 121b of the cylindrical portion 121. Further, the inner diameter of the front side portion 121a is larger than the inner diameter of the penetration bore 111a of the inner cylindrical wall portion 111.

The cover portion 122 of the cover cylinder 12 is assembled on the outer peripheral surface of the cylindrical portion 121 and the rear end portion of the main cylinder 11 so that the opening of the main cylinder 11 and the rear end side opening of the cylindrical portion 121 can be closed thereby. A penetration bore 122a is formed on the bottom wall of the cover portion 122. The cover portion 122 is made from an elastic material and is extendable or contractible in an axial direction and the bottom wall thereof is biased in rearward.

The input piston 13 is slidably disposed within the cover cylinder 12 in response to the operation (depression) of a brake pedal 10. The input piston 13 is formed to be of a cylindrical shape with a bottom surface at a front side and an opening at a rear side. A bottom wall 131 forming the bottom surface of the input piston 13 has a diameter larger than the diameters of any other portions of the input piston 13. The bottom wall 131 of the input piston 13 is arranged to be positioned at a rear end of the front portion of the cylindrical portion 121. The input piston 13 is axially slidably and liquid-tightly disposed in the rear portion 121b of the cylindrical portion 121.

An operation rod 10a and a pivot 10b of the brake pedal 10 are operatively connected to the input piston 13. One end of the operation rod 10a is extending outwardly from the master cylinder 1 through the opening of the input piston 13 and the penetration bore 122a of the cover portion 122 and is operatively connected to the brake pedal 10. The operation rod 10a moves in response to the operation of the brake pedal 10 and moves forward contracting the cover portion 122 in an axial direction when the brake pedal 10 is depressed. Together with the forward movement of the operation rod 10a, the input piston 13 also moves forward.

The first master piston 14 is axially slidably disposed in the main cylinder 11 and more particularly, the first master piston 14 is formed by a first main body portion 141 and a projection portion 142. The first main body portion 141 is co-axially disposed within the main cylinder 11 in the front side of the inner cylindrical wall portion 111. The first main body portion 141 includes an opening at a front side and a bottom wall 141a at a rear side and is formed to be of approximately a cylindrical shape. In other words, the first main body portion 141 is formed by the bottom wall 141a and a peripheral wall portion 141b.

The bottom wall 141a is axially slidably and liquid-tightly disposed in the main cylinder 11 at the front side of the inner cylindrical wall portion 111. The peripheral wall portion 141b is formed to be of cylindrical shape, the diameter of which is smaller than the diameter of the bottom wall 141a and extends co-axially from the central portion of the front end surface of the bottom wall 141a to frontward. The front portion of the peripheral wall portion 141b is axially slidably and liquid-tightly disposed in the small diameter portion 112. The rear portion of the peripheral wall portion 141b is separated from the inner peripheral surface of the main cylinder 11.

The projection portion 142 of the first master piston 14 is of columnar shape projecting from the central portion of the end surface of the bottom wall 141a of the first main body portion 141 in a rear direction and disposed axially slidably and liquid-tightly disposed in the penetration bore 111a of the inner cylindrical wall portion 111. The rearward portion of the projection portion 142 is positioned inside of the cylindrical portion 121 through the penetration bore 111a. Further, the rearward portion of the projection portion 142 is separated from the inner peripheral surface of the cylindrical portion 121. The rear end surface of the projection portion 142 is separated from the bottom wall 131 of the input piston 13 by a predetermined distance. The first master piston 14 is biased by a biasing member 143 formed by a spring material in a rearward direction.

It is noted here that the servo chamber (corresponding to drive pressure chamber) 1A is delimited by the rear end surface of the bottom wall 141a of the first main body portion 141, front end surface of the inner cylindrical wall portion 111, the inner peripheral surface of the main cylinder 11 and the outer peripheral surface of the projection portion 142. Further, the first reaction force chamber 1B is delimited by the rear end surface of the inner cylindrical wall portion 111, an outer surface of the input piston 13, inner peripheral surface of the front portion 121a of the cylindrical portion 121 and the outer surface of the projection portion 142. The second reaction force chamber 1C (corresponding to the fluid pressure chamber) is delimited by the front end surface of the bottom wall 141a, rear end surface (including a sealing member 91) of the small diameter portion 112, outer surface of the peripheral wall portion 141b and inner peripheral surface of the main cylinder 11.

The second master piston 15 is co-axially disposed within the main cylinder 11 at the front side. The second master piston 15 includes an opening at a front side and a bottom wall 151a at a rear side and is formed to be of approximately a cylindrical shape. In other words, the second master piston 15 is formed by the bottom wall 151 and the peripheral wall portion 152 the diameter of which is the same as the diameter of the bottom wall 151. The bottom wall 151 is disposed between the small diameter portions 112 and 113 at the front side of the first master piston. The rear end portion including the bottom wall 151 of the second master piston 15 is separated from the inner peripheral surface of the main cylinder 11. The peripheral wall portion 152 is of cylindrical shape and extends co-axially from the bottom wall 151 in a frontward direction. The peripheral wall portion 152 is axially slidably and liquid-tightly disposed in the small diameter portion 113. The second master piston 15 is biased in a rearward direction by a biasing member 153 formed by a spring material.

It is noted here that the first master chamber 1D is delimited by the outer surface of the second master piston 15, front end surface of the first master piston 14, inner surface of the first master piston, the front end surface (including a sealing member 92) of the small diameter portion 112, the rear end surface (including the sealing member 93) of the small diameter portion 113 and the inner peripheral surface of the main cylinder 11 between the small diameter portions 112 and 113. The second master chamber 1E is delimited by inner bottom surface 111d of the main cylinder 11, front end surface of the second master piston 15, inner surface of the second master piston 15, front end surface (including the sealing member 94) of the small diameter portion 113 and the inner peripheral surface of the main cylinder 11.

The area of the rear end surface of the bottom wall 141a (the area facing the servo chamber 1A) is set to be larger than the area of front end surface of the peripheral wall portion 141b (the area facing the first master chamber 1D).

The master cylinder 1 is provided with a plurality of ports 11a through 11i which are served as the fluid communication passage between the inside and outside of the master cylinder 1. The port 11a is formed on the main cylinder 11 at rear side portion relative to the inner cylindrical wall portion 111. The port 11b is formed on the main cylinder 11 at the same position with the port 11a in an axial direction and is positioned facing the port 11a. The port 11a and the port 11b are in fluid communication through a space formed between the inner peripheral surface of the main cylinder 11 and the outer peripheral surface of the cylindrical portion 121. The port 11a is connected to a conduit 161, whereas the port 11b is connected to a reservoir 171. Accordingly, the port 11a is in fluid communication with the reservoir 171 via the port 11b.

The port 11b is also in fluid communication with the first reaction force chamber 1B through a passage 18 formed on the cylindrical portion 121 and the input piston 13. This passage 18 is closed when the input piston 13 advances forward. Accordingly, the fluid communication between the first reaction force chamber 1B and the reservoir 171 is interrupted upon such forward movement of the input piston 13.

The port 11c is formed on the main cylinder 11 at a position ahead of the port 11a. The port 11c connects the first reaction force chamber 1B with a conduit 162. The port 11d is formed on the main cylinder 11 at a position ahead of the port 11c and connects the servo chamber 1A with a conduit 163. The port 11e is formed on the main cylinder 11 at a position ahead of the port 11d and connects the second reaction force chamber 1C with a conduit 164.

The port 11f is formed on the small diameter portion 112 of the main cylinder 11 and is positioned between the sealing members 91 and 92. The port 11f connects a reservoir 172 with the inside space of the main cylinder 11. The port 11f is in fluid communication with the first master chamber 1D through a passage 144 formed on the first master piston 14. The passage 144 of the first master piston 14 is formed at a position somewhat rearward of the sealing member 92 under non-operation condition so that the fluid communication between the first master chamber 1D and the port 11f is interrupted by the sealing member 92 when the first master piston 14 advances forward.

The port 11g is formed on the main cylinder 11 at a position ahead of the port 11f on the small diameter portion 112 and connects the first master chamber 1D with a conduit 51. The port 11h is formed on the small diameter portion 113 of the main cylinder 11 and is positioned between the sealing members 93 and 94. The port 11h connects a reservoir 173 with the inside space of the main cylinder 11. The port 11g is in fluid communication with the second master chamber 1E through a passage 154 formed on the second master piston 15. The passage 154 of the second master piston 15 is formed at a position somewhat rearward of the sealing member 94 under non-operation condition so that the fluid communication between the second master chamber 1E and the port 11g is interrupted by the sealing member 94 when the second master piston 15 advances forward. The port 11i is formed on the main cylinder 11 and positioned ahead of the port 11h and connects the second master chamber 1E with a conduit 52.

Sealing members formed of, such as O-ring are provided in the master cylinder 1 at the positions where necessary (indicated with black circles in the drawings). The sealing members 91 and 92 are provided on the small diameter portion 112 and are liquid-tightly in contact with the outer peripheral surface of the first master piston 14. Similarly, the sealing members 93 and 94 are provided on the small diameter portion 113 and are liquid-tightly in contact with the outer peripheral surface of the second master piston 15. Further, sealing members are provided between the input piston 13 and the cylindrical portion 121 for sealing therebetween.

The stroke sensor 72 detects the stroke amount (pedal depression amount) of the brake pedal 10 and the detection results are sent to the brake ECU 6.

(Reaction Force generating Device 2)

The reaction force generating device 2 is provided with a stroke simulator 21. The stroke simulator 21 generates a reaction force pressure in the first reaction force chamber 1B and the second reaction force chamber 1C in response to the depression of the brake pedal 10 by the operator. Generally, the stroke simulator 21 is structured by a cylinder 211, a piston 212 disposed in the cylinder and slidably movable within the cylinder, a compression spring 213 disposed in the cylinder 211 for biasing the piston in an axial direction and a pilot fluid chamber 214 formed in the cylinder 211 at one side of the piston 212. The stroke simulator 21 is connected to the second reaction force chamber 1C via the conduit 164 and the port 11e and further connected to the separation lock valve 22 and the reaction force valve 3. A hydraulic pressure (corresponding to the fluid pressure) is generated in the second reaction force chamber 1C in response to the stroke position of the first master piston 14. In other words, it can be said that the hydraulic pressure in response to the displacement of the first master piston 14 is generated in the second reaction force chamber 1C.

(Separation Lock Valve 22)

The separation lock valve 22 is a normally closed type electromagnetic valve and the open/close operation is controlled by the brake ECU 6. The separation lock valve 22 is connected to conduits 164 and 162 for establishing/interrupting the fluid communication of the conduits 162 and 164 thereby to establish/interrupt fluid communication between the first reaction force chamber 1B and the second reaction force chamber 1C.

(Pressure Sensor 73)

The pressure sensor 73 detects mainly the pressure (reaction force pressure) in the first and the second reaction force chambers 1B and 1C and is connected to the conduit 164. The pressure sensor 73 detects the pressures in both first and second reaction force chambers 1B and 1C when the separation lock valve 22 is in open state and detects only the pressure in the second reaction force chamber 1C when the separation lock valve 22 is in closed state.

(Reaction Force Valve 3)

The reaction force valve 3 is a normally open type electromagnetic valve and the opening and closing operations are controlled by the brake ECU 6. The reaction force valve 3 is connected to the conduits 164 and 161 for establishing/interrupting fluid communication of the conduits 161 and 164 thereby to establish/interrupt fluid communication between the first and the second reaction force chambers 1B and 1C and the reservoir 171.

(Servo Pressure Generating Device 4)

The servo pressure generating device 4 is mainly formed by a pressure decrease valve 41, a pressure increase valve 42, a pressure supply portion 43 and a regulator 44. The pressure decrease valve 41 is a normally open type electromagnetic valve and the flow rate thereof is controlled by the brake ECU 6. One port of the pressure decrease valve 41 is connected to the conduit 161 via the conduit 411 and the other port is connected to the conduit 413. Accordingly, the pressure decrease valve 41 is, on one hand, connected to the reservoir 171 via conduits 411 and 161 and ports 11a and 11b. The pressure increase valve 42 is a normally closed type electromagnetic valve and one port thereof is connected to the conduit 421 and the other port thereof is connected to the conduit 422.

The pressure supply portion 43 supplies the regulator 44 with a high pressure brake fluid upon receipt of instructions from the brake ECU 6. The pressure supply portion 43 is formed mainly by an accumulator 431, a hydraulic pump 432, a motor 433 and a reservoir 434.

The accumulator 431 of the pressure supply portion 43 accumulates the hydraulic pressure generated by the hydraulic pump 432 and is connected to the regulator 44, a pressure sensor 75 and the hydraulic pump 432. The hydraulic pump 432 is connected to the motor 433 and the reservoir 434. The hydraulic pump 432 supplies the accumulator 431 with a brake fluid reserved in the reservoir 434 upon driving operation of the motor 433. The pressure sensor 75 detects the pressure in the accumulator 431.

When the pressure sensor 75 detects that the pressure in the accumulator 431 is decreased to a predetermined value or less, the motor 433 is driven upon receipt of the control signal from the brake ECU 6 and then the hydraulic pump 432 supplies the accumulator 431 with brake fluid to supplement pressure energy to the accumulator 431.

Figure 2:
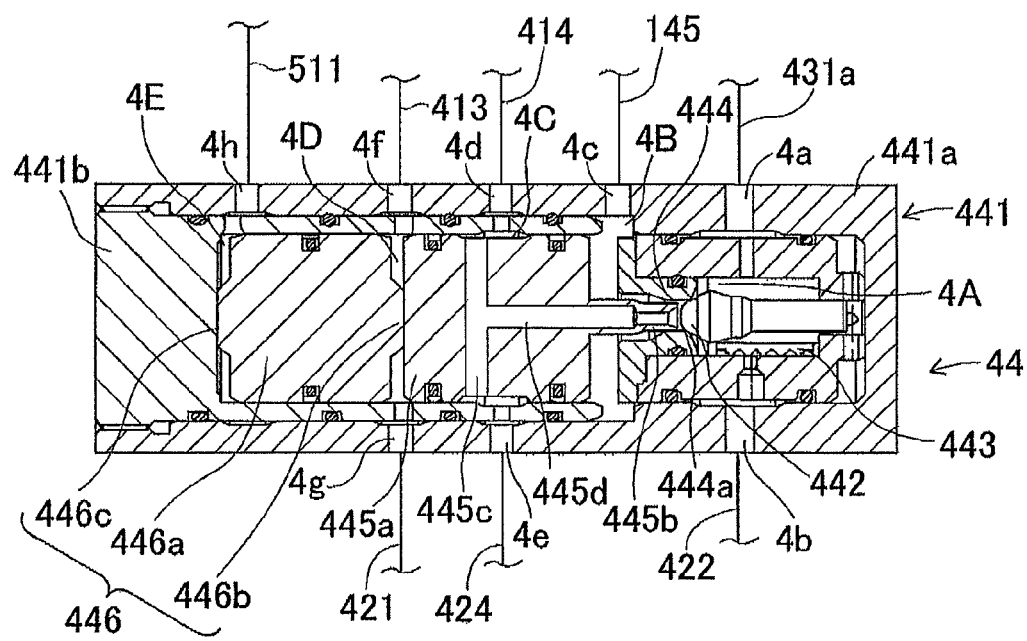
FIG. 2 is an explanatory view of the structure of regulator showing a partial cross sectional view.

The regulator 44 of this embodiment includes a sub piston 446 in addition to a general type regulator. In other words, as shown in FIG. 2, the regulator 44 is provided mainly with a cylinder 441, a ball valve 442, a biasing portion 443, a valve seat portion 444, a control piston 445 and the sub piston 446.

The cylinder 441 is formed by a cylinder case 441a approximately cylindrical shape having a bottom surface at one end (right side in FIG. 2) and a cover member 441b for closing an opening (left side in FIG. 2) of the cylinder case 441a. For explanatory purpose, the cross section of the cover member 441b is indicated as a U-shape. However, according to this embodiment, the cover member 441b is of columnar shape and a portion closing the opening of the cylinder case 441a is referred to as the cover member 441b. A plurality of ports 4a through 4h is formed on the cylinder case 441a for fluid communication between inside and outside of the cylinder 441.

The port 4a is connected to the conduit 431a and the port 4b is connected to the conduit 422. The port 4c is connected to the conduit 163 through a conduit 145 and the port 4d is connected to the conduit 161 through a conduit 414. The port 4e is connected to a conduit 424 which is connected to the conduit 422 through a relief valve 423. The port 4f is connected to the conduit 413 and the port 4g is connected to a conduit 421. The port 4h is connected to a conduit 511 which is eventually connected to the conduit 51.

The ball valve 442 is of a ball type valve disposed in the cylinder 441 at the bottom surface side of the cylinder case 441a (also referred to as "cylinder bottom surface side"). The biasing portion 443 is made by a spring which biases the ball valve 442 towards the opening side of the cylinder case 441a (also referred to as "cylinder opening side). The biasing portion 443 is disposed at the bottom surface of the cylinder case 441a. The valve seat portion 444 is a wall portion provided on the inner peripheral surface of the cylinder case 441a. The valve seat portion 444 delimits the inside of the cylinder into two parts, cylinder opening side and the cylinder bottom surface side. A penetration bore 444a is provided at the central portion of the valve seat portion 444 to establish fluid communication between the delimited two parts, cylinder opening side and the cylinder bottom surface side. The valve seat portion 444 holds the ball valve 442 from the cylinder opening side to close the penetration bore 444a by the spring biased ball valve 442.

A first chamber 4A is a space delimited by the ball valve 442, the biasing portion 443, the valve seat portion 444 and the inner peripheral surface of the cylinder case 441a at the cylinder bottom surface side. The first chamber 4A is filled with the brake fluid and is connected to the conduit 431a through the port 4a. Further, the first chamber 4A is connected to the conduit 422 via the port 4b.

The control piston 445 includes a columnar shaped main body portion 445a and a columnar shaped projecting portion 445b having a diameter smaller than the diameter of the main body portion 445a. The main body portion 445a is co-axially and liquid-tightly disposed in the inside of the cylinder 441 at the cylinder opening side of the valve seat portion 444 and is movable in an axial direction. The main body portion 445a is biased by a biasing means (not shown) towards the cylinder opening side and is provided with a passage 445c at an axially central portion. Both sides of the passage 445c are open to the peripheral surface of the main body portion 445a. The passage 445c extends in a peripheral direction (up/down direction as viewed in FIG. 2). A part of the inner peripheral surface of the cylinder 441 corresponding to the end openings of the passage 445c provided with the port 4d and at the same time the part is dented to form a concave portion on the outer peripheral surface of the main body portion 445a. This concave portion and the main body portion 445a define a third chamber 4C.

The projecting portion 445b is projected from the end surface of the cylinder bottom surface side of the main body portion 445a towards the cylinder bottom surface side. The diameter of the projecting portion 445b is smaller than the diameter of the penetration bore 444a. The projecting portion 445b and the penetration bore 444a are in co-axially arranged with each other. The tip end of the projecting portion 445b is separated from the ball valve 442 by a predetermined distance from the cylinder opening side. A passage 445d is formed in the projecting portion 445b and is open to the central portion of the cylinder bottom surface side of the projecting portion 445b. The passage 445d extends in cylinder axial direction towards the inside of the main body portion 445a and is connected to the passage 445c thereof.

A second chamber 4B is formed by a space delimited by the end surface of the cylinder bottom surface side, outer surface of the projecting portion 445b inner peripheral surface of the cylinder 441, valve seat portion 444 and the ball valve 442. The second chamber 4B is connected to the ports 4d and 4e through the passages 445c and 445d and the third chamber 4C.

The sub piston 446 is formed by a sub main body portion 446a, a first projecting portion 446b and a second projecting portion 446c. The sub main body portion 446a is formed of approximately columnar shape and is disposed in the cylinder 441 at the cylinder opening side of the main body portion 445a. The sub main body portion 446a is coaxially and liquid-tightly disposed in the cylinder 441 and movable in an axial direction.

The first projecting portion 446b is of columnar shape and having a diameter smaller than the sub main body portion 446a. The first projecting portion 446b projects from the central portion of the end surface of the cylinder bottom surface side of the sub main body portion 446a and is in contact with end surface of the cylinder opening side of the main body portion 445a. The second projecting portion 446c is of similar shape with the first projecting portion 446b and is projecting from the central portion of the end surface of the cylinder opening side of the sub main body portion 446a. The second projecting portion 446c is in contact with the cover member 441b.

A pressure control chamber 4D is a space in the cylinder delimited by the end surface of the cylinder bottom surface side of the sub main body portion 446a, outer surface of the first projecting portion 446b, end surface of the cylinder opening side of the control piston 445 and inner peripheral surface of the cylinder 441. The pressure chamber 4D is connected to the pressure decrease valve 41 via the port 4f and the conduit 413 and also is connected to the pressure increase valve 42 via the port 4g and the conduit 421.

On the other hand, a fourth chamber 4E is a space delimited by the end surface of the cylinder bottom surface side of the sub main body portion 446a, outer surface of the second projecting portion 446c, cover member 441b and inner peripheral surface of the cylinder 441. The fourth chamber 4E is connected to the port 11g via port 4h and conduits 511 and 51. The four chambers 4A through 4E are filled with the brake fluid and the pressure sensor 74 detects the pressure in the servo chamber 1A (servo-pressure) and is connected to the conduit 163.

(Brake Apparatus 5)

The first master chamber 1D and the second master chamber 1E which generate master cylinder pressure are in fluid communication with the wheel cylinders 541 through 544 via conduits 51 and 52 and ABS (Anti-lock Brake System) 53. The wheel cylinders constitute the brake apparatus 5 for braking vehicle wheels 5FR, 5FL, 5RR and 5RL. In more detail, the port 11g of the first master chamber 1D and the port 11i of the second master chamber 1E are in fluid communication with the ABS 53 which is a well-known anti-lock brake system through conduits 51 and 52, respectively. The wheel cylinders 541 through 544 for controlling the braking of the vehicle wheels 5FR, 5FL, 5RR and 5RL are operatively connected to the ABS 53.

The operation of the anti-lock brake operation of the ABS 53 will be explained with an example of controlling a front right wheel 5FR of the vehicle wheels 5FR, 5FL (front left side wheel), 5RR (rear right side wheel) and 5RL (rear left side wheel), and explanation of operation of the other wheels is omitted. The ABS 53 includes an input valve (corresponding to the electromagnetic valve) 531, a pressure decrease valve 532, a reservoir 533, a pump 534 and a motor 535. The input valve 531 is a normally open type electromagnetic valve and the opening/closing operation thereof is controlled by the brake ECU 6. The input valve 531 is connected to the conduit 52 at one end and is connected to the wheel cylinder 541 and the pressure decrease valve 532 at the other side.

Further, in detail, the input valve 531 according to the embodiment of the invention is an electromagnetic valve which changes force for interrupting the flow passage in response to the degree of the supplied electric power. The force for interrupting the flow passage is for example a biasing force for biasing the valve member towards the opening of the master cylinder 1 side. The force becomes strong as the supply of the electric power increases. When the force applied to the wheel cylinder 541 through 544 side from the master cylinder 1 side (corresponding to the pressure differential between the master cylinder 1 side and the wheel cylinder side) becomes stronger than the force for interrupting the flow passage, the input valve 531 becomes in open state. As explained, the input valve 531 has the operating characteristics (IP performance) which include a relationship between the supplied electric power and the pressure differential between the pressure in the master cylinder 1 side and the pressure in the wheel cylinder 541 through 544 side and controls the flow of brake fluid between the master cylinder 1 and the wheel cylinders 541 through 544 in response to the amount of supplied electric power. The input valve 531 is provided with a check valve Z which prevents the flow from the master cylinder side to the wheel cylinder side but allows the flow from the wheel cylinder side to the master cylinder side.

The pressure decrease valve 532 in the ABS 53 is a normally closed type electromagnetic valve and the opening/closing operation is controlled by the brake ECU 6. One port of the pressure decrease valve 532 is connected to the wheel cylinder 541 and the input valve 531 and the other port is connected to the reservoir 533. When the pressure decrease valve 532 becomes in open state, fluid communication between the wheel cylinder 541 and the reservoir is established.

The reservoir 533 is used for reserving the brake fluid therein and is connected to the conduit 52 via the pressure decrease valve 532 and the pump 534. The pump 534 is connected to the reservoir 533 at the suction port and is connected to the conduit 52 at the discharge port via a check valve Z. It is noted here that the check valve Z is disposed in the conduit to allow the flow from the pump 534 to the conduit 52 (eventually to the second master chamber 1E) but prevents the flow in reverse direction. The pump 534 is driven by the motor 535 which is operated in response to the instructions from the brake ECU 6. The pump 534 suctions the brake fluid in the wheel cylinder 541 or the brake fluid reserved in the reservoir 533 and returns the brake fluid to the second master chamber 1E via the conduit 52 under the pressure decreasing mode in the ABS control operation. Usually, a damper means (not shown in the embodiment) is provided in the upstream side of the pump 534 to suppress the pulsation of the brake fluid ejected from the pump 534.

The ABS 53 is provided with a vehicle wheel speed sensor (not shown) for each vehicle wheel 5FR to 5RL to detect each wheel speed (rotation speed) and the detected vehicle wheel speed is sent to the brake ECU 6.

According to thus structured ABS 53, the ABS control operation (anti-lock brake control operation) is executed by controlling of switching over operation of the electromagnetic valves 531 and 532 and adjusting brake pressure to be applied to the wheel cylinder 541, i.e., the braking force to be applied to the vehicle wheel 5FR by driving motor 535 when necessary based on the vehicle condition, such as, the master cylinder pressure, a vehicle wheel speed condition and a front/rear acceleration. The ABS 53 is a device for supplying wheel cylinders 5FR through 5RL with brake fluid supplied from the master cylinder 1 by adjusting the amount of the brake fluid and timing of supply based on the instructions from the brake ECU 6.

In the liner control mode, which will be later explained in detail, the hydraulic pressure from the accumulator is controlled by the pressure increase valve 42 and the pressure decrease valve 41 and the servo pressure is generated in the servo chamber 1A to advance the first and the second master pistons 14 and 15 to generate hydraulic pressure in the first and the second master chambers 1D and 1E, respectively. Thus generated pressure is supplied to the wheel cylinders 541 through 544 via the ports 11g and 11i, the conduits 51 and 52 and the ABS 53 as the master cylinder pressure and hydraulic braking pressure is applied to the vehicle wheels 5FR through 5RI.

(Brake ECU 6)

The brake ECU 6 is an abbreviation of "Electronic Control Unit" which electrically communicates with various sensors 72 through 75 and controls electromagnetic valves 22, 3, 41, 42, 531 and 532 and motors 433 and 535 upon receipt of signals therefrom. The brake ECU 6 memorizes two control modes therein, one is a linear control mode and the other is REG control. The linear control mode is a normal braking control mode for controlling the servo pressure in the servo chamber 1A by controlling the pressure decrease valve 41 and pressure increase valve 42 under the separation lock valve 22 being open and the reaction force valve 3 being closed. The REG control mode is a braking control mode in which the pressure decrease valve 41, pressure increase valve 42, the separation lock valve 22 and the reaction force valve 3 are de-energized or de-energized due to failure (mode for keeping normal state).

(Brake Operation)

The brake operation will be explained hereinafter. When the brake pedal 10 is depressed by the operator of the vehicle, the input piston 13 is advanced forward (to the right in FIG. 1) and the passage 18 in the cylindrical portion 12 is closed to thereby interrupt fluid communication between the reservoir 171 and the first reaction force chamber 1B. In this linear control mode (normal brake operation), the reaction force valve 3 is controlled to be closed and the separation lock valve 22 is controlled to be open. Accordingly, the first and the second reaction force chambers 1B and 1C are in fluid communication but the fluid communication thereof with the reservoir 171 is interrupted. The stroke simulator 21 then generates reaction force pressure in the first and the second reaction force chambers 1B and 1C in response to the stroke amount of the brake pedal.

Even the reaction force pressure is generated in the first and the second reaction force chambers 1B and 1C, since such reaction force pressure is exerted on the rear end surface (rearward end surface of the projection portion 142) and the front end surface (frontward end surface of the bottom wall 141a) of the first master piston 14, the master piston is driven by the servo pressure generated in the servo chamber 1A. On the other hand, under the REG control mode, the reaction force valve 3 is controlled to be open and the separation lock valve 22 is controlled to be closed. The first reaction force chamber 1B becomes liquid-tight state and the second reaction force chamber 1C hydraulically communicates with the reservoir 171. Thus the first master piston 14 is driven to move in response to the depression of the brake pedal 10.

(Operating Characteristics Obtaining Control)

Figure 3:
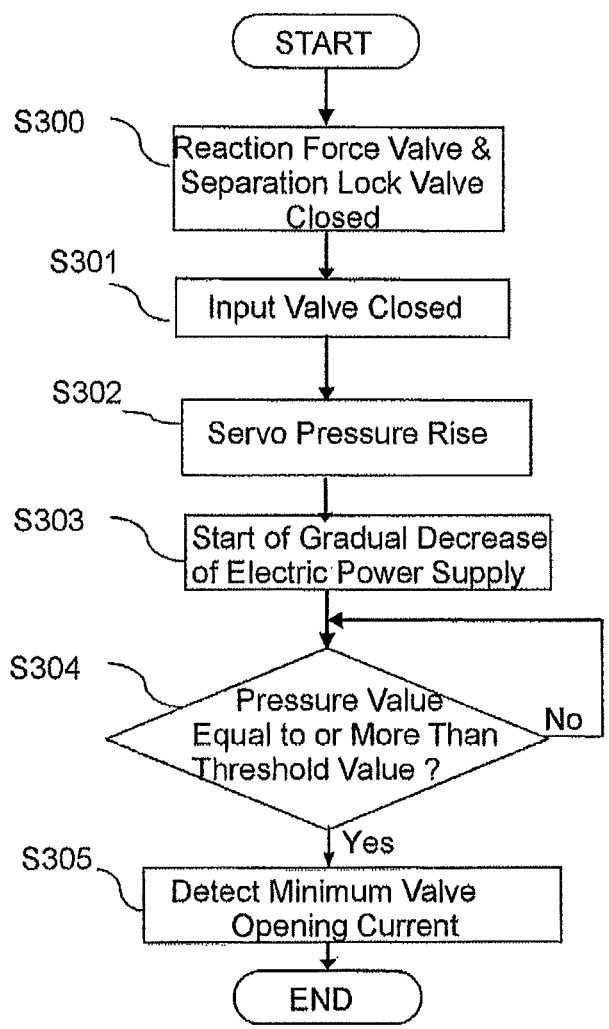
FIG. 3 is a flowchart showing a controlling method of obtaining the operating characteristics according to the embodiment of the invention.

The control for obtaining the operating characteristics of the input valve 531 by the brake ECU 6 will be explained hereinafter. As shown in FIG. 3, upon obtaining control of the operating characteristics, the brake ECU 6 controls the separation lock valve 22 and the reaction force valve 3 to be in closed state (S300). Then the brake ECU 6 generates a signal that instructs the electric power supply source (not shown) to supply input valve 531 with a predetermined electric power so that the input valve 531 be closed (S301). Next, the brake ECU 6 controls the pressure decrease and increase valves 41 and 42 so that the servo pressure generated in the servo chamber 1A rises independently of the depression force of the brake pedal 10 (S302). With the rise of the servo pressure, the first and the second master pistons 14 and 15 move forward thereby to raise the master cylinder pressure. This operation generates the pressure differential between the pressure in the master cylinder 1 side and the pressure in the wheel cylinder 541 through 544 side with respect to the closed state input valve 531. The pressure in the master cylinder 1 side becomes higher than the pressure in the wheel cylinder side.

Further, the volume of the second reaction force chamber 1C decreases when the first master piston 14 moves forward and the brake fluid flows into the stroke simulator 21 to move the piston 212 of the stroke simulator 21 against the biasing force of the compression spring 213. Accordingly, the pressure in the pilot pressure chamber 214, i.e., the pressure in the second reaction force chamber 10 becomes high. The pressure in the second reaction force chamber 1C is detected and measured by the pressure sensor 73. In other words, the brake ECU 6 controls the servo pressure to generate a predetermined pressure differential between the master cylinder 1 and the wheel cylinders 541 through 544. The brake ECU 6 corresponds to the pressure differential generating means. The input valve 531 is supplied with the electric power which is not large enough to open the input valve 531 under the predetermined pressure differential.

Figure 4:
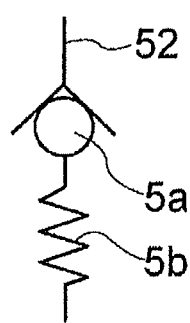
FIG. 4 is an explanatory schematic view of an input valve.

Consecutively, the brake ECU 6 gradually decreases the supply of the electric power to the input valve 531 (S303). The brake ECU 6 at this stage corresponds to the supply electric power control means. The input valve 531 will be conceptually explained with reference to FIG. 4. As an example, the input valve 531 includes a valve member 5a which closes the conduit 52 and a biasing member 5b which biases the valve member 5a towards the master cylinder 1 side. As the supply of the electric power to the input valve 531 increases, the biasing force of the biasing member 5b becomes large. As the supply of the electric power decreases, the biasing force decreases accordingly. In other words, if the supply of the electric power is gradually decreased, at a certain point, the input valve 531 opens by being defeated by the pressure differential. When the input valve 531 becomes in open state, the brake fluid flows from the high pressure side (master cylinder 1 side) to the low pressure side (wheel cylinder side). This causes the decrease of the master cylinder pressure in the master cylinder 1 and the first and the second master pistons 14 and 15 move forward by the servo pressure. With the forward movement of the first master piston 14, the volume of the second reaction force chamber 1C decreases and the brake fluid in the second reaction force chamber 1C flows into the stroke simulator 21 to move the piton 212 to increase the pressure in the pilot pressure chamber 214.

The brake ECU 6 gradually decreases the supply of electric power to the input valve and at the same time to judge whether the pressure value measured by the pressure sensor 73 becomes equal to or more than a predetermined threshold value (corresponding to the predetermined pressure) (S304). The brake ECU 6 at this stage corresponds to the fluid pressure detecting means. When the pressure value measured by the pressure sensor 73 becomes equal to or more than the predetermined threshold value (S304: Yes), the brake ECU 6 memorizes the detected value of the electric power supplied to the input valve 531 at the time of pressure equal to or more than the threshold value (S305). The brake ECU 6 at this stage corresponds to the supplied electric power detecting means. Thus, the minimum electric current value for opening the input valve 531, minimum voltage value for opening the valve and minimum electric power value for opening the valve against the predetermined pressure differential can be obtained. It is noted here that in this specification, the control of supply electric power includes both detections of supply of the electric current and the supply of the electric voltage. According to this embodiment, the brake ECU 6 obtains the minimum valve opening electric current 11 for opening the input valve 531 against the predetermined pressure differential P1 by increasing or decreasing the value of the electric current to the input valve 531 under the constant voltage state.

Similar to the above control, the operating characteristic (IP performance) of the input valve 531 can be calculated by obtaining the minimum valve opening electric current 12 at another pressure differential P2. By obtaining a plurality of minimum valve opening electric current values under the corresponding number of pressure differential values, more accurate operating characteristics can be obtained. The brake ECU 6 presumes the operating characteristics from the plurality of minimum valve opening electric current values for the memorized plurality of pressure differential values and sets the presumed operating characteristics as the operating characteristics of the input valve 531. This operating characteristics obtaining control can be performed before the shipping of the vehicle or at the time of periodical vehicle inspection. It may be set that as in step S304, the change of pressure value measured by the pressure sensor 73 may be detected whether the change value becomes equal to or more than a predetermined range. In other words, the threshold value for detecting the opening of the input valve 531 can be set to the change amount (range) of the pressure in the second reaction force chamber 1C.

Thus, according to the brake ECU 6 of the embodiment, the brake ECU 6 functions as a device for increasing or decreasing the supply of electric power to the input valve 531 under the predetermined pressure differential being generated, a device for detecting whether the pressure in the second reaction force chamber 1C has reached to the predetermined pressure differential value or more with the increase or decrease of the supply of the electric power (detecting whether the value of the pressure change range being equal to or more than a predetermined range), a device for detecting the supply electric power to the input valve 531 at the time when the pressure has been detected to be equal to or more than the predetermined value (or the pressure change has been detected to be equal to or more than the predetermined change range) and a device for setting the operating characteristics which exhibit a relationship between the supply amount of the electric power to the input valve 531 and the pressure differential value between the master cylinder 1 side and the wheel cylinder side relative to the input valve 531 based on the detected supply amount of the electric power to the input valve 531.

According to the embodiment, the operating characteristics can be obtained without using the pressure values in the upstream side and the downstream side of the input valve which are directly measured, but using the pressure in the second reaction force chamber 1C where the pressure deviation is less influenced. According to this method, the influence of pressure deviation which might often occurred in both upstream and downstream sides of the input valve 531, particularly, influence of the pressure deviation in the downstream side (wheel cylinder side) of the input valve 531 can be eliminated to improve the obtaining operation of the operating characteristics.

Further, according to the embodiment, the area As facing the surface of the servo chamber 1A located rearward of the first master piston 14 is set to be larger than the area Am facing the first master chamber 1D located frontward of the first master piston 14. In other words, the value As relative to the value Am is set to be larger than one (1) (As/Am>1). Accordingly, the displacement amount of the first master piston 14 (stroke amount) becomes great relative to the change of the pressure differential between the servo pressure and the master cylinder pressure (servo pressure is greater than the master cylinder pressure). Therefore, the first master piston 14 advances greatly forward when the master cylinder pressure decreases due to the opening of the input valve 531 and the pressure change in the second reaction force chamber 1C becomes great. Thus the pressure rise in the second reaction force chamber 1C due to the opening of the input valve 531 can be accurately detected. The master cylinder 1 is structured so that the displacement amount of the first master piston 14 relative to the change in pressure in the first master chamber 1D becomes great and further is structured so that the change of fluid pressure relative to the change of the hydraulic pressure in the first master chamber 1D is set to be greater than the pressure change of the hydraulic pressure in the first master chamber 1D.

(Modified Embodiment)

Figure 5:
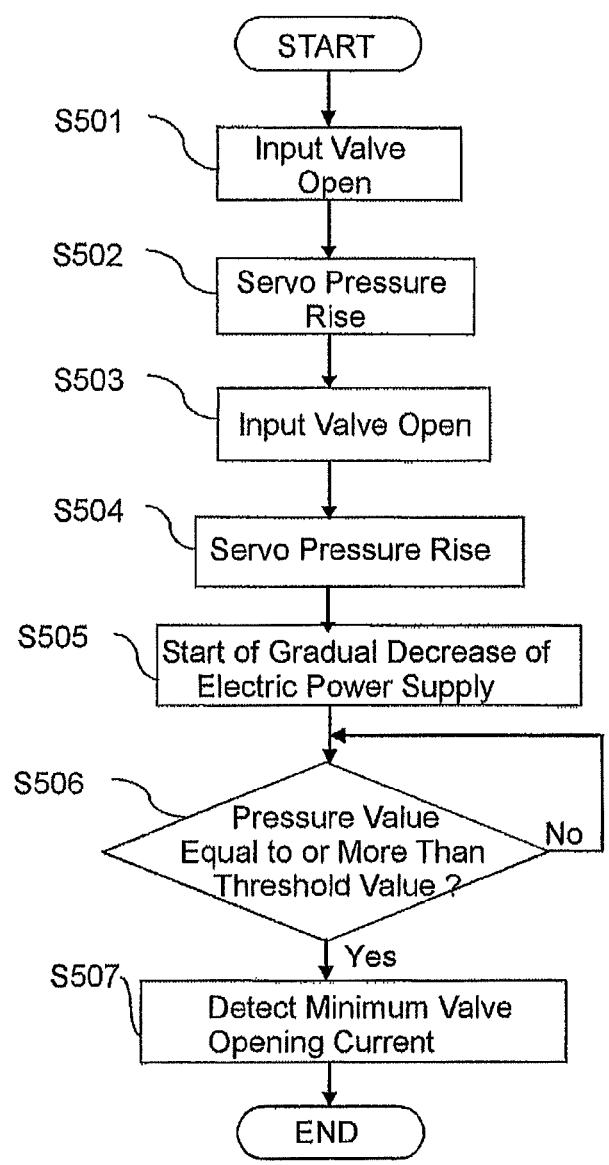
FIG. 5 is a flowchart showing a controlling method of obtaining the operating characteristics according to another embodiment of the invention.
Figure 6:
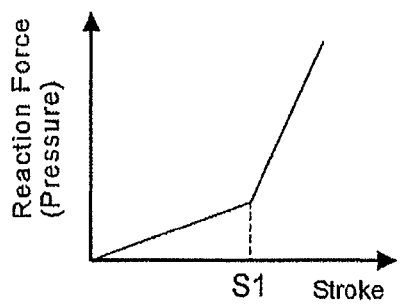
FIG. 6 is an explanatory schematic view of a stroke simulator showing the operating characteristics thereof.

The present invention is not limited to the embodiment explained above, but changes or modifications thereof may be included within the spirit of the invention. For example, the operating characteristics obtaining control can be performed differently as shown in FIG. 5. According to this modified embodiment, at the step S501 the brake ECU 6 controls the input valve 531 to be in open state (non-energized state) and raises the servo pressure to a predetermined pressure value by controlling the pressure decrease and increase valves 41 and 42 (S502). The predetermined pressure value is set based on the relationship between the pressure in the stroke simulator 21 and the stroke amount (displacement position of the first master piston 14) as shown in FIG. 6. Generally a stroke simulator has characteristic that the pressure change relative to the stroke change amount value S1 becomes greater in the area where the value of stroke is greater than the value S1 than in the area where the value of stroke is less than the value S1. The inventors focused on this characteristics and set the predetermined pressure value of the servo pressure to a pressure value where the stroke amount of the first master piston 14 is equal to or greater than the value S1. Thus, the stroke position of the first master piston 14 advances into the position where the stroke amount is equal to or more than the value S1.

Next, continued to the above operation of the modified embodiment, the brake ECU 6 supplies the input valve 531 with the electric power to close the valve 531 (S503). After that, the servo pressure is further raised to generate the predetermined pressure differential as similar to the operation of the previous embodiment (S504). Then the supply of the electric power to the input valve 531 is gradually decreased (S505), The brake ECU 6, after the pressure sensor 73 has detected the measured pressure reached to the threshold value or more than that, (S506:Yes) memorizes the value of the supplied electric power to the input valve 531 at the time of the pressure having reached equal to or more than the threshold value (S507).

According to this control for obtaining the operating characteristics of the modified embodiment, by utilizing the characteristics that the pressure change amount per unit stroke amount of the stroke simulator 21 becomes greater, more accurately the necessary supply electric power at the time of opening of the input piston can be obtained. In more detail, the pressure value indicated by the pressure sensor 73 is greatly changed (increased) even when the displacement amount of the piston 212 of the stroke simulator 21 in response to the forward movement of the first master piston 14 during the opening state of the input valve 531 is small. Accordingly, the brake ECU 6 can detect the forward movement of the first master piston 14, i.e., the opening timing of the input valve 531 with a highly sensitive manner.

Thus, since the second reaction force chamber 1C is connected to the stroke simulator 21, the operating characteristics can be suitably obtained by utilizing the characteristics of the stroke simulator. Further, the second reaction force chamber 1C may be used as a reaction chamber for generating a reaction force in response to the depression of the brake pedal 10 together with the first reaction force chamber 1B. In other words, according to the vehicle brake device having two separate reaction force chambers of this invention, the second reaction force chamber 1C formed frontward of the first master piston 14 can be used as a means for obtaining the operating characteristics. This vehicle brake device can be structured without using additional new devices, which leads to the reduction of manufacturing cost.

Upon setting the values for comparison between the pressure value measured by the pressure sensor 73 (hereinafter, referred to as the sensor pressure value) and the threshold value, the following method may be used in which since the sensor pressure value keeps approximately a constant value under the pressure differential being generated at both sides of the electromagnetic valve 531, the threshold value may be set to be a value greater than such constant and stable value. Thus the sensor pressure is detected at the time when the sensor pressure value rises from the approximately the constant and stable value.

Further, the pressure value of the pressure sensor sometimes has undesired noises such as conversion noises. Therefore, the brake ECU 6 calculates the standard deviation of the sensor pressure value per unit of time for a predetermined time period when the sensor pressure value is stable after the generation of the pressure differential at the same time the brake ECU 6 calculates the mean value of the sensor pressure value per unit of time for a predetermined time period. The brake ECU 6 calculates the standard deviation and the mean value per unit of time (calculating so-called moving average) and compares the upper limit value at the "n"th time (wherein "n" is a natural number) with the mean value at the "n+1"th time. The brake ECU 6 judges that the sensor pressure value exceeded the threshold value when the mean value $Av_{n+1}$ at the "n+1"th time has exceeded the upper limit value $St_{nmax}$ of the standard deviation at the "n"th time ($Av_{in+1} > St_{nmax}$). Then the brake ECU 6 memorizes the detected supply electric power to the electromagnetic valve (input valve) 531 at the time of start of "n+1"th predetermined time. Thus, the influence of the noise on the measured value deviation can be suppressed and the valve opening time based on the actual measurement value (true value) of the pressure sensor 73 can be detected to improve the detection accuracy of the minimum supply electric power.

According to the embodiment, the pressure differential between the second master cylinder 15 side (upstream side) and the wheel cylinder 541 side (downstream side) is generated by setting the fluid pressure in the conduit 52 at upstream side of the input valve 531 being higher than the fluid pressure at the downstream side.

However, the pressure differential between the second master cylinder 15 side (upstream side) and the wheel cylinder 541 side (downstream side) may be generated by setting the fluid pressure in the conduit 52 at downstream side of the input valve 531 being higher than the fluid pressure at the upstream side. In this structure, when the electromagnetic valve is opened, the master cylinder pressure increases and the master piston is retreated to generate smaller fluid pressure. Therefore, the operating characteristics can be set based on the supply electric power to the electromagnetic valve when the fluid pressure becomes equal to or less than the predetermined value.

According to the embodiment, the operating characteristics of the input valve 531 are set as an example. However, it is not limited to such setting of the input valve 531 and the operating characteristics of other electromagnetic valves constituting the hydraulic control portion (such as ABS control) provided between the master cylinder and the wheel cylinders may be set, instead of the input valve.

The setting method of the operating characteristics of the electromagnetic valve according to this invention is applicable to an electromagnetic valve of normally closed type. In this situation, the supply electric power to the normally closed type electromagnetic valve is detected after the fluid pressure value (reaction force value) becomes a predetermined value by gradually increasing the supply of electric power to the normally closed type electromagnetic valve and the operating characteristics of the normally closed type electromagnetic valve are set based on the detection of the supply electric power thereto.

According to the embodiment, the second reaction force chamber 1C is referred to as "fluid pressure chamber". However, a pressure chamber in which a fluid pressure in response to the stroke position of the master piston is generated can be provided in the master cylinder 1, separately from the second reaction force chamber 1C.

According to the embodiment, the brake fluid pressure is generated in the second reaction force chamber 1C as the "fluid pressure". However, a pressure chamber in which a pneumatic pressure is generated according to the stroke position of the master piston may be provided in the master cylinder 1.

According to a first aspect of the embodiment of the invention, the fluid pressure in response to the stroke position of the master piston 14, 15 is generated in the fluid pressure chamber (second reaction force chamber 1C) and the brake ECU 6 obtains the operating characteristics of the electromagnetic valve (input valve 531). The fluid pressure chamber 1C can be formed with a structure more simple than the structures of the master cylinder 1 and the wheel cylinders 541 to 544. According to this structure, the deviation or fluctuation of the pressure generated in the fluid pressure chamber 1C in response to the stroke position of the master piston 14, 15 is relatively small compared to the deviation occurred in the fluid conduit in which the electromagnetic valve 531 is disposed. Accordingly, the operating characteristics of the electromagnetic valve can be accurately set based on the pressure change in response to the opening of the electromagnetic valve 531 by reducing the influence from the deviations of the individual components. Comparing with the features in the Patent Document 1, the vehicle brake device according to the embodiment can reduce the influence of pressure deviation particularly in the downstream side of the electromagnetic valve 531 to improve the obtaining accuracy of the operating characteristics of the valve.

Further, according to a second aspect of the embodiment of the invention, the vehicle brake device includes a drive pressure generating portion (servo pressure generating device 4) which generates a predetermined pressure differential by moving the master piston 14, 15 to a predetermined stroke position where the change of the fluid pressure relative to a displacement of the master piston has become an amount within a predetermined range or more by a control of the servo pressure generating device 4. Since the hydraulic (fluid) pressure can be largely changed with respect to the displacement of the master piston 14, 15, the supply of electric power to the electromagnetic valve 531 when the fluid pressure change is larger than a predetermined value or range, such supply of electric power for opening of the valve 531 can be accurately detected.

According to a third aspect of the embodiment of the invention, the stroke simulator 21 is connected to the second reaction force chamber 1C and accordingly, the characteristics of the stroke simulator 21 can be utilized as the characteristics of the fluid pressure in response to the stroke position of the master piston 14, 15. Further, the fluid pressure chamber is commonly used as a reaction force generating chamber 1C in response to the depression force of the brake pedal 10.

According to a fourth aspect of the embodiment of the invention, since the master cylinder 1 is structured so that the change of the fluid pressure in the reaction force chamber 1B, 1C, is set to be larger than a change of the pressure in the master chamber 1D, 1E. Accordingly, the pressure change in the master chamber 1D, 1E becomes great upon opening of the electromagnetic valve 531. This can accurately detect the supply of the electric power to the electromagnetic valve 531.

What is claimed is:
1. A vehicle brake device comprising:
a master cylinder including a master chamber connected to a wheel cylinder, a drive pressure chamber in which a drive pressure is generated for driving a master piston and a fluid pressure chamber in which a fluid pressure is generated in response to a stroke position of the master piston, wherein the fluid pressure chamber is hydraulically separated from the master chamber;
an electromagnetic valve disposed between the master chamber and the wheel cylinder for controlling a brake fluid flow between the master chamber and the wheel cylinder in response to an electric power supplied to the electromagnetic valve;
a pressure differential generating means for generating a predetermined pressure differential between a master cylinder side and a wheel cylinder side with respect to the electromagnetic valve;
a supplied electric power controlling means for decreasing or increasing a supply amount of the electric power to the electromagnetic valve under the predetermined pressure differential being generated;
a fluid pressure detecting means for detecting that the fluid pressure in the fluid pressure chamber has reached a predetermined value or more or has decreased to less than the predetermined value in response to a decrease or an increase of the supply amount of the electric power, or for detecting that the fluid pressure in the fluid pressure chamber has changed by a predetermined range or more in response to a decrease or an increase of the supply amount of the electric power to the electromagnetic valve;
a supplied electric power detecting means for detecting the supply amount of the electric power to the electromagnetic valve when the fluid pressure in the fluid pressure chamber is detected to have reached the predetermined value or more, or decreased to less than the predetermined value or when the fluid pressure in the fluid pressure chamber is detected to have changed by the predetermined range or more by the fluid pressure detecting means;
an operating characteristics setting means for setting operating characteristics of the electromagnetic valve which include a relationship of the pressure differential between the master cylinder side and the wheel cylinder side with respect to the electromagnetic valve based on the supply amount of the electric power detected by the supplied electric power detecting means; and
a drive pressure generating means for generating the drive pressure in the drive pressure chamber, wherein the pressure differential generating means generates the predetermined pressure differential by moving the master piston to a predetermined stroke position when the change of the fluid pressure in the fluid pressure chamber relative to a displacement of the master piston is equal to or greater than a predetermined range.

2. The vehicle brake device according to claim 1, wherein the fluid pressure chamber is connected to a stroke simulator.

3. The vehicle brake device according to claim 1, wherein the master cylinder is structured so that the change of the fluid pressure in the fluid pressure chamber is larger than a change of the pressure in the master chamber.

* * * * *